(No Model.)  2 Sheets—Sheet 1.

H. M. TRUESDELL.
FLOCK MACHINE FEEDER.

No. 366,137. Patented July 5, 1887.

WITNESSES:
F. McArdle.
C. Sedgwick.

INVENTOR:
H. M. Truesdell
BY Munn & Co.
ATTORNEYS.

(No Model.) 2 Sheets—Sheet 2.

H. M. TRUESDELL.
FLOCK MACHINE FEEDER.

No. 366,137. Patented July 5, 1887.

WITNESSES:
F. McArdle
C. Sedgwick

INVENTOR:
H. M. Truesdell
BY Munn & Co
ATTORNEYS.

UNITED STATES PATENT OFFICE.

HAYDEN M. TRUESDELL, OF WEST STOCKBRIDGE, MASSACHUSETTS.

FLOCK-MACHINE FEEDER.

SPECIFICATION forming part of Letters Patent No. 366,137, dated July 5, 1887.

Application filed January 3, 1887. Serial No. 223,252. (No model.)

*To all whom it may concern:*

Be it known that I, HAYDEN M. TRUESDELL, of West Stockbridge, in the county of Berkshire and State of Massachusetts, have invented a new and Improved Flock-Machine Feeder, of which the following is a full, clear, and exact description.

This invention relates to a novel form of feeder for flock-machines, the object of the invention being to provide a feeder whereby the stock may be fed to the machine in such quantities as may be required for the proper operation of the machine.

To the end named the invention consists of a series of flanged rolls mounted so as to exextend across the bottom of a feed box or hopper, and of a stamp or plunger that is arranged to force the stock to the flock-machine, as will be hereinafter more fully described, and specifically pointed out in the claims.

Reference is to be had to the accompanying drawings, forming a part of this specification, in which similar figures of reference indicate corresponding parts in all the views.

Figure 1:
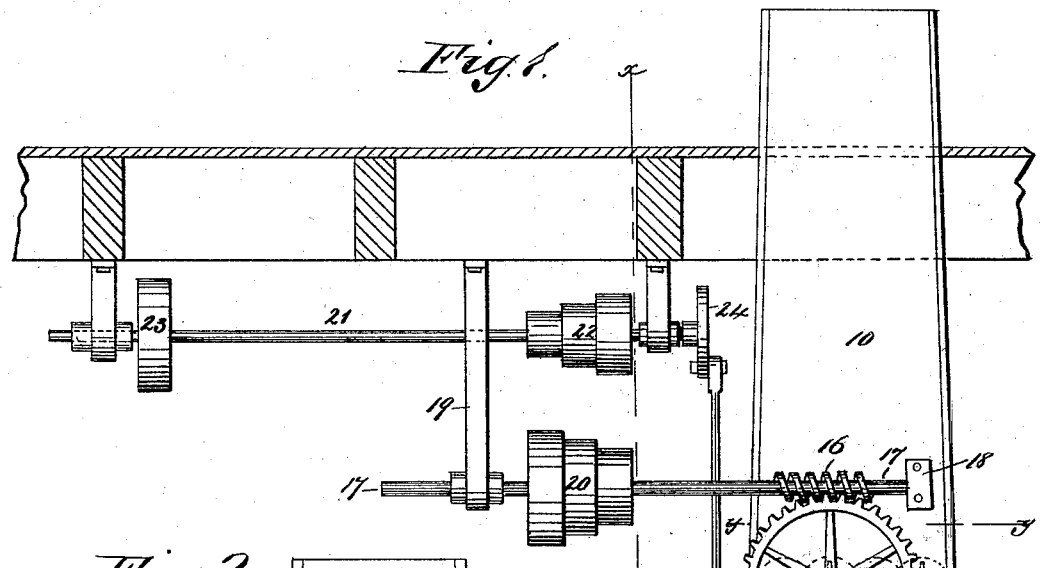
Figure 2:
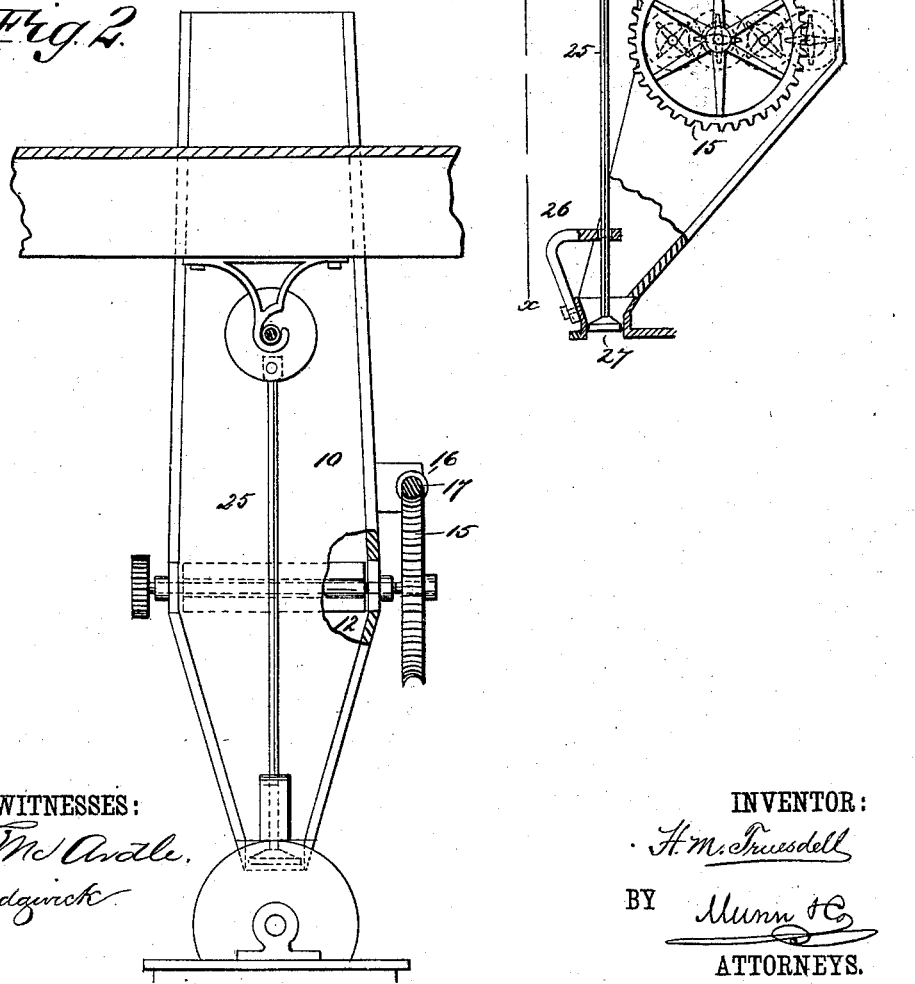
Figure 3:
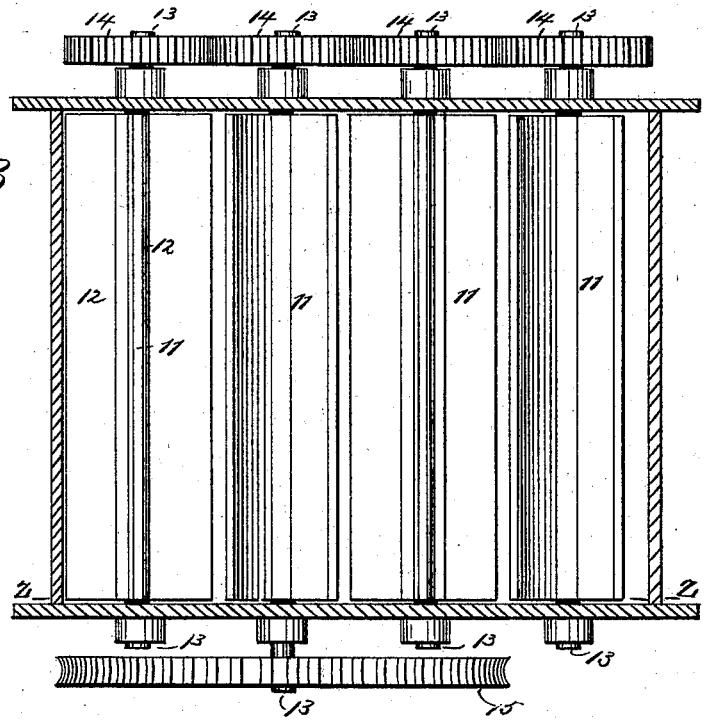

Figure 1 is a side view of my improved form of stock-feeder for flock-machines, the bottom of the hopper being shown in section. Fig. 2 is a sectional view taken on line *x x* of Fig. 1, part of the feed-box being broken away. Fig. 3 is an enlarged sectional plan view, the view being taken on line *y y* of Fig. 1; and Fig. 4 is a cross-sectional plan view taken on line *z z* of Fig. 3.

Figure 4:
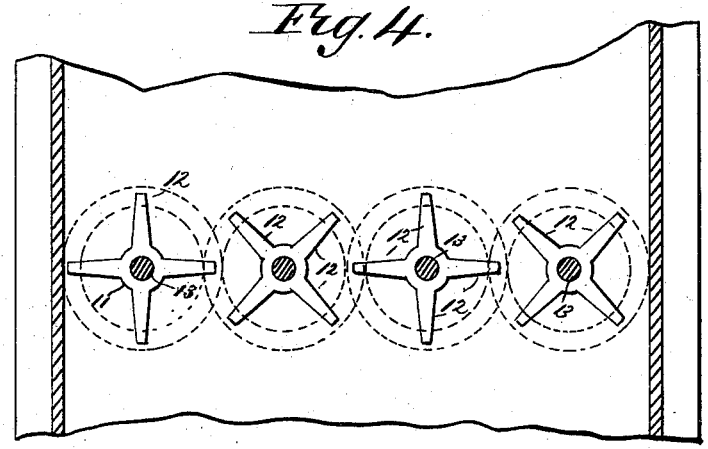

In constructing such a stock-feeder as the one illustrated in the drawings above referred to, I provide a feed box or hopper, 10, across which there are arranged a series of rollers, 11, said rollers being provided with projections 12, which may be in the form of flanges, as best shown in Figs. 3 and 4, or the projections may be simple pegs. Upon one of the projecting ends of the shafts 13, upon which the rollers 11 are mounted, there are arranged intermeshing gears 14. Upon the other extending end of one of the shafts 13 there is mounted a large gear, 15, that is engaged by a worm, 16, carried by a horizontal counter-shaft, 17, that is supported at one end by a bearing, 18, carried by the hopper or box, and at the other end by bearings carried by a hanging bracket, 19. Upon this shaft 17 there is mounted a cone-pulley, 20. The main shaft 21, which is arranged above the counter-shaft 17, is provided with a cone-pulley, 22, the shaft 17 being driven by means of a belt that is arranged in connection with the pulleys 20 and 22, the shaft 21 being driven by means of a belt that passes over a pulley, 23, that is carried by said shaft. Upon that end of the shaft 21 which is nearest to the hopper 10 there is mounted a crank-wheel, 24, to which there is secured a plunger, 25, said plunger being guided by a bracket, 26, and provided with a a stamping-head, 27, which, as the shaft 21 revolves, is reciprocated within the mouth of the hopper 10.

With such a feeder as has been described, such an amount of stock as may be required for the proper operation of the machine may be fed to said machine during any given interval of time by varying the speed at which the rollers 12 revolve, these rollers acting to force the stock downward toward the mouth of the hopper, while the stamping head 27 acts to force the stock out of the feeder and into the machine.

Having thus fully described my invention, I claim as new and desire to secure by Letters Patent—

1. A flock-feeder comprising the hopper, the series of shafts having projections, and the plunger at the mouth of the hopper, substantially as set forth.

2. In a flock-feeder, the combination, with a hopper, 10, of rollers mounted therein and formed with projections 12, intermeshing gears 14, carried by the rollers, a gear, 15, carried by one of the rollers, a mechanism whereby the gear 15 and consequently the rollers are revolved, a plunger, and a plunger-operating mechanism, substantially as described.

HAYDEN M. TRUESDELL.

Witnesses:
    WM. C. SPAULDING,
    J. S. MOORE.